US012005921B2

(12) United States Patent
Krüger et al.

(10) Patent No.: US 12,005,921 B2
(45) Date of Patent: Jun. 11, 2024

(54) ASSISTANCE SYSTEM WITH RELEVANCE-DEPENDENT STIMULUS MODULATION

(71) Applicants: Honda Research Institute Europe GmbH, Offenbach/Main (DE); Honda Motor Co., Ltd., Tokyo (JP)

(72) Inventors: Matti Krüger, Offenbach (DE); Masayuki Sato, Thochigi (JP); Takahiro Matsuoka, Thochigi (JP); Tsuyoshi Nojiri, Thochigi (JP)

(73) Assignees: Honda Research Institute Europe GmbH, Offenbach/Main (DE); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/961,567

(22) Filed: Oct. 7, 2022

(65) Prior Publication Data

US 2023/0116198 A1    Apr. 13, 2023

(30) Foreign Application Priority Data

Oct. 8, 2021   (EP) ..................................... 21201585

(51) Int. Cl.
*B60W 50/16*   (2020.01)
*B60W 40/08*   (2012.01)
*B60W 50/14*   (2020.01)

(52) U.S. Cl.
CPC ............ *B60W 50/16* (2013.01); *B60W 40/08* (2013.01); *B60W 2050/143* (2013.01);
(Continued)

(58) Field of Classification Search
CPC ................. B60W 50/16; B60W 40/08; B60W 2050/143; B60W 2050/146; B60W 2540/229; B60W 2554/4046
See application file for complete search history.

(56) References Cited

U.S. PATENT DOCUMENTS 9,650,041 B2    5/2017  Feit et al.
9,896,031 B1 *  2/2018  Groh .................... B60R 11/0217
(Continued)

FOREIGN PATENT DOCUMENTS

EP    3413288    12/2018
EP    3531337    8/2019
(Continued)

*Primary Examiner* — Mohamed Barakat
(74) *Attorney, Agent, or Firm* — JCIPRNET

(57) ABSTRACT

A method for assisting a person to perform a task in a dynamic environment comprises a step of acquiring data on the dynamic environment, and of predicting at least one behavior of an object or event in the dynamic environment based on the acquired data. The method proceeds by determining a relevance measure of the at least one behavior of the object or event based on the prediction. Then a modulation signal is generated, wherein the modulation signal changes at least one signal parameter as a function of the determined relevance. The modulation signal is then used to modulate at least one directional stimulus signal, wherein the at least one modulated directional stimulus signal further depends on a direction of the predicted at least one behavior of the object or event with respect to the assisted person. The at least one modulated stimulus signal is then output to the assisted person.

17 Claims, 4 Drawing Sheets

(52) U.S. Cl.
 CPC . *B60W 2050/146* (2013.01); *B60W 2540/229* (2020.02); *B60W 2554/4046* (2020.02)

(56) References Cited

U.S. PATENT DOCUMENTS

| | | | | |
|---|---|---|---|---|
| 2017/0120803 | A1* | 5/2017 | Kentley | B60W 10/04 |
| 2017/0156000 | A1 | 6/2017 | Boesen | |
| 2018/0357913 | A1* | 12/2018 | Krüger | G08G 9/02 |
| 2019/0118834 | A1* | 4/2019 | Wiebel-Herboth | G08G 1/166 |
| 2020/0041638 | A1* | 2/2020 | Akamine | G01S 13/931 |

FOREIGN PATENT DOCUMENTS

| | | |
|---|---|---|
| EP | 3723066 | 10/2020 |
| WO | 2019186560 | 10/2019 |

\* cited by examiner

ASSISTANCE SYSTEM WITH RELEVANCE-DEPENDENT STIMULUS MODULATION

CROSS-REFERENCE TO RELATED APPLICATION

This application claims the priority benefit of European Patent Application No. 21 201 585.3, filed on Oct. 8, 2021. The entirety of the above-mentioned patent application is hereby incorporated by reference herein and made a part of this specification.

TECHNICAL FIELD

The invention relates to assistance systems for assisting persons in mobility related tasks, for example to assistance systems for vehicles. The invention concerns an assistance system, an assistance method and a human-machine interface for the assistance system and method.

TECHNICAL BACKGROUND

Assistance systems for mobility-related tasks, such as assisting an operator in traffic navigation in the automotive, aeronautical or maritime domain are well established. Assistance systems can contribute positively to an operator's situation assessment, to his navigation skills and therefore to safety in the mobility environment, in which the assisted person operates.

A timely perception of task- and safety-relevant information is not always guaranteed during mobility tasks in environments that contain multiple elements that may occupy or affect the attention of a person. For example, in case the person is driving his vehicle ("ego-vehicle") while simultaneously listening to music played on an infotainment system of the ego-vehicle, the music may interfere with sound from the environment that includes relevant information for performing the driving task. Perceiving the sound with the relevant information is therefore more difficult for person.

In particular, in a highly dynamic environment such as a current road traffic environment, complex situations with multiple choices for a next action to be performed by the person driving the ego-vehicle occur. The person may have difficulties in selecting one particular action that maximizes utility from the plurality of possible actions if not all relevant information available has been considered during the selection process. When, for example, a vehicle preceding to the ego-vehicle on a road with plural lanes in one direction decelerates the person driving the ego-vehicle may have to choose between slowing down the ego-vehicle, possibly at the expense of energy efficiency or changing to another available lane of the additional lanes. The choice by the person depends on information on a current as well as a predicted occupancy of neighboring lanes in near future. However, a currently existing gap enabling a change of the ego-vehicle onto a neighboring lane may no longer be available at decision time, if the person due to the dynamically changing traffic scenario in dynamic environment does not acquire information on the currently available fast enough.

Concerning the automotive traffic environment, there exist currently approaches to enhance existing vehicles by addition of wearable devices. Using wearable devices may even increase safety in vehicles.

Patent application publication US 2017/0156000 A1 discloses a wearable earpiece configured to connect wirelessly with an ego-vehicle. Having connected with the vehicle, the earpiece enters a driving mode. In the driving mode, the earpiece senses ambient sound with a microphone associated with the earpiece and reproduces the sensed ambient sound with its speaker. The earpiece may combine audio streams comprising ambient sound from within the vehicle cabin and from outside the vehicle cabin with further audio streams from entertainment or infotainment systems and audio messages associated with vehicle state information or vehicle alert conditions. An intelligent control system may modify audio characteristics of the reproduced audio streams, in particular reduce or amplify an amplitude of the ambient sound or portions thereof. Modifying audio characteristics of the reproduced audio streams may depend on detecting particular actions of the driver of the vehicle, or for providing audio cues to regarding presence or absence of other vehicles in the environment of the ego-vehicle.

US 2017/0156000 A1 is silent with regard to a risk assessment of a traffic scenario. The earpiece representing the focus of US 2017/0156000 A1 does not provide the capability to provide directional stimuli for guiding an assisted person into a particular direction. The assisted person's focus of attention, his vigilance, historic attention patterns or assumed targets of other traffic participants are all disregarded. In short, US 2017/0156000 A1 provides a limited enhancement of situational awareness, both with regard to predicted evolvement of a dynamic scene and limited to audible information only. Essentially, US 2017/0156000 A1 attempts to overcome the disadvantages and dangers of wearing earpieces in an ego-vehicle.

U.S. Pat. No. 9,650,041 B2 discloses a method implementing a predictive human-machine interface for preventing accidents in a vehicle based on detecting an eye-gaze vector of the driver and detecting locations of nearby objects and their velocities in the environment of the vehicle. The method determines a vehicle accident risk under the detected circumstances and the driver's situation awareness of the detected circumstances. The method may activate a vehicle alert based on the determined vehicle accident risk and driver's situation awareness. The method may tailor the vehicle alert in type based on the determined vehicle accident risk, the driver's situation awareness, based on a determined level of driver experience of the driver of the ego-vehicle, and even weather and traffic conditions. Tailoring the type of vehicle alert includes selecting a predefined alert type, or deciding whether to provide only minimal number of help messages or to provide all help messages to the assisted driver. The alert types may differentiate between driver side alerts and passenger side alerts. The method may lock out to at least some degree an infotainment system of the ego-vehicle in connection with tailoring the vehicle alert and the driver experience level. U.S. Pat. No. 9,650,041 B2 discloses the human-machine interface in combination with accident prevention systems (driving assistance systems) such as a lane keeping assistance system, a crash mitigating braking system, and a lane change and blind spot indication system. The accident prevention system may exert active control of the vehicle in case the determined vehicle accident risk requires immediate action.

The method of U.S. Pat. No. 9,650,041 B2 has the disadvantage that binary decisions, such as displaying alert or not, selecting a specific alert type or not, locking out infotainment system, detecting a vehicle in the alert zone are possible. Support of the assisted person based on such binary decisions and alerts may lead to reduced situation awareness of the assisted person ("overreliance on assistance system"), or reducing acceptance of the assistance system by the assisted person ("annoying alerts").

There remains the task of assisting a person that performs a task in a dynamic environment that provides assistance by supporting the assisted person in focusing their attention towards scene elements relevant to the task and depending on their risk potential with regard to the task, the assistance yielding a high acceptance of the assistance from the person's perspective.

The method for assisting a person according to a first aspect, the assistance system according to the second aspect, and the computer program according to the third aspect solve the problem.

The dependent claims define further advantageous embodiments of the invention.

SUMMARY

In the first aspect, a method for a assisting a person to perform a task in a dynamic environment, comprises acquiring data on the dynamic environment, and predicting at least one behavior of an object or an event in the dynamic environment based on the acquired data. The method proceeds with a step of determining a relevance measure of the at least one behavior of the object or the event based on the prediction. A modulation signal is generated, wherein the modulation signal changes at least one signal parameter as a, preferably continuous, function of the determined relevance. At least one directional stimulus signal is then modulated with the generated modulation signal, wherein the at least one modulated directional stimulus signal further depends on a direction of the predicted at least one behavior of the object or the event with respect to the assisted person. Then the at least one modulated stimulus signal is output to the assisted person.

In the second aspect, an assistance system for assisting a person to perform a task in a dynamic environment comprises an acquisition interface configured to acquire data on the dynamic environment. A processor is configured to predict at least one behavior of an object or event in the dynamic environment based on the acquired data, to determine a relevance measure of the at least one behavior of the object or event based on the prediction. The processor generates a modulation signal, wherein the modulation signal changes at least one signal parameter as a continuous function of the determined relevance. The processor is configured to then modulate at least one directional stimulus signal with the modulation signal, wherein the at least one modulated directional stimulus signal further depends on a direction of the predicted at least one behavior of the object or event with respect to the assisted person. The system further comprises at least one actuator configured to output the at least one modulated stimulus signal to the assisted person.

In the third aspect, the invention concerns a computer program with program-code means for executing the steps according to one of the embodiments of the method for assisting a person, when the program is executed on a computer or digital signal processor.

The third aspect may concern a computer program-product with program-code means stored on a machine-readable medium for executing the steps according to one of the embodiments of the method for assisting a person, when the program is executed on a computer or digital signal processor.

The third aspect may concern a non-transitory computer-readable storage medium embodying a program of machine-readable instructions executable by a digital processing apparatus to cause the digital processing apparatus to perform operations according to an embodiment of the method for assisting a person.

BRIEF DESCRIPTION OF THE DRAWINGS

The discussion of embodiments of the invention refers to the attached figures in which.

DETAILED DESCRIPTION

Figure 1:
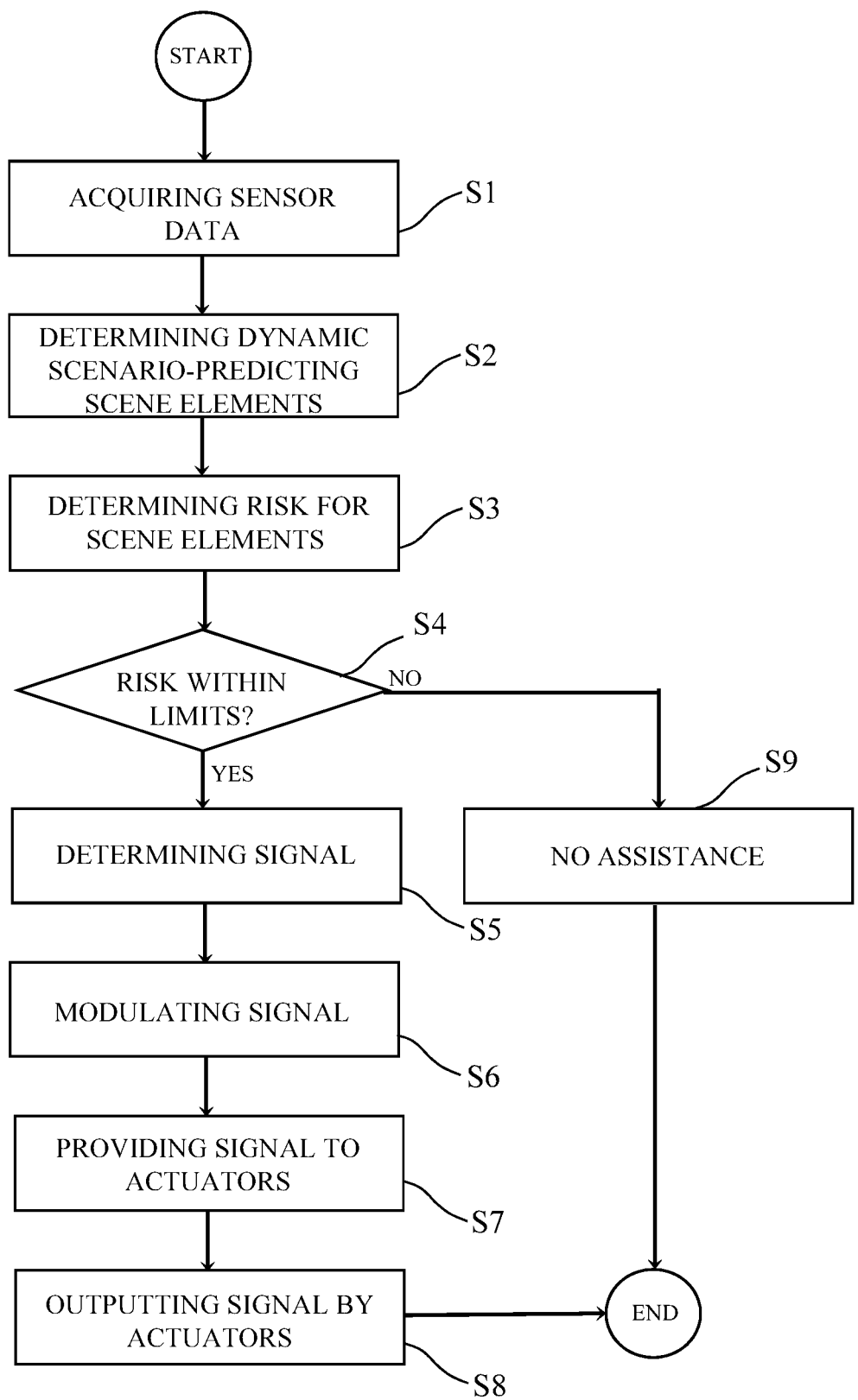
FIG. 1 depicts a flowchart for an assistance method of an embodiment of the method.

The figures designate identical or corresponding elements using same reference signs in order to facilitate understanding wherever considered possible. The description omits a discussion of same reference signs in different figures for sake of conciseness.

The disclosure combines several advantageous effects with regard to previously known approaches. An influence of task-irrelevant or potentially task distracting factors can be reduced.

A salience of task-relevant factors in the environment can be increased.

Information about the assisted person's attention and attention history can be taken into account in order to optimize a task appropriate assistance for the assisted person.

It is possible, to take information about the assumed targets of other agents in the dynamic environment into account in order to optimize the assistance to the person according to global safety or efficiency targets.

Means to draw the persons attention to a possible source of danger are known in the prior art, the method improves beyond the known means by lowering the salience of stimuli to the assisted person that potentially distract from the (primary) task. The assisted person may improve its understanding of references to ambient objects, their behavior and predicted events in the dynamic environment due to targeted signal modulation, amplification of relevant signals and directional correspondence. Even more, maintaining support beyond the duration of disturbing factors to the task to accommodate an extended need of the assisted person. Information on the assisted person's attention is taken into regard in order to optimize the provided assistance.

The most direct effect on a performance measure the method has, is supporting an increased speed of information perception on the dynamic environment by the assisted person, and by achieving an enhanced understanding and prompting of a corresponding reaction that is achievable by providing a facilitated access to the relevant information on the dynamic environment.

Furthermore, the function that drives the assistance may support a variety of task objectives, which go beyond direct personal utility and may trigger positive traffic-regulating second order effects.

The method according to an embodiment comprises determining a state of the assisted person, and adapting a risk-dependent stimulus modulation based on the determined state.

The determined state of the assisted person may comprise at least one of a state of attention of the assisted person, an attention history of the assisted person, and a vigilance of the assisted person.

The at least one stimulus signal can include at least one of an audio signal, a visual signal, and a tactile signal.

The at least one stimulus signal may include an artificial stimulus signal, in particular a recorded sound signal.

The at least one signal parameter may be one of a stimulus amplitude, a stimulus frequency, a stimulus repetition rate, and a perceived signal direction.

A perceived signal direction of the directional stimulus signal includes a spatial origin of the directional stimulus signal as perceived by the assisted person, or an angular direction towards the predicted behavior or the event in the environment in relation to the assisted person.

The terms stimulus amplitude, stimulus frequency, stimulus repetition rate, and perceived signal direction encompass not only discrete values of the respective parameter, but also ranges of respective parameter values.

In one embodiment the at least one stimulus signal includes at least one of an audio signal stream, and the at least one signal parameter is one of an audio volume and an audio signal frequency band.

The method according to an embodiment comprises detecting further stimuli perceivable by the assisted person and including the detected further stimuli in the at least one directional stimulus signal before modulating the at least one directional stimulus signal.

Detecting further stimuli perceivable by the assisted person may include stimuli that are predetermined in advance, e.g. during a design phase of the assistance system, and which are assumed to be perceivable by the assisted person, e.g. in the current scenario in the dynamic environment. In an example, the method may assume that the assisted person, e.g. a driver of a vehicle, is able to hear the audio output by vehicle radio, the method may modulate the stimulus signal including the audio output by the vehicle radio, without actually checking whether the assisted person is actually able to perceive the audio signal. Alternatively or additionally, the further stimuli perceivable by the assisted person include stimuli, e.g. including the audio signal output of the radio, recorded sound from another vehicle driving in the environment of the assisted person in the actual situation, e.g., during runtime of the assistance method.

Detecting further stimuli perceivable by the assisted person forms the basis for decreasing an influence of potentially task-irrelevant or distracting stimuli on the assisted person. Including the detected further stimuli in the at least one directional stimulus signal before modulating the at least one directional stimulus signal and then increasing the salience of those stimuli, which are relevant with regard to the predicted behavior of an object or event supports focusing the attention of the assisted person towards the task-relevant elements.

In the method according to an embodiment, the continuous function continuously increases a salience of the at least one stimulus signal perceived by the assisted person for an increase in the determined relevance. Alternatively or additionally, the continuous function continuously decreases a perceived distance to the predicted behavior of the object or the event in the at least one directional stimulus signal perceived by the assisted person for an increase in the determined relevance.

Furthermore, the continuous function may decrease continuously a salience of the at least one stimulus signal perceived by the assisted person for a decrease in the determined relevance.

This reduces, dependent on the decreasing relevance, a distraction of the assisted person and enables the assisted person to focus its attention on other elements in the environment. Other relevant elements become more noticeable.

A return to a level of infotainment sound preceding the modulation due to a determined risk, for example, may be offset by a specific time delay, or follow a recovery curve of the modulation signal with a low gradient (flat slope) of the modulation strength with regard to the relevance.

The delayed return to normal levels, in particular levels preceding the communication of the determined risk, provides the assisted person some time to readjust to a resolving situation involving the risk as a specific example for the relevance.

According to an embodiment, a value of a gradient of the continuous function for a decrease in salience of the at least one stimulus signal over time is smaller than the value of the gradient of the continuous function for the increase in salience of the at least one stimulus signal over time.

This specific example of different gradients for an increase in saliency on the one hand, and a decrease in salience on the other hand, ensures that the assisted person may direct its attention to those aspects in the environment early, which show high relevance. Additionally, the method directs the assisted person to maintain a sufficient degree of attention to those aspects, even when the relevance start to decrease again. Thus, the method directs the assisted person to judge for herself the relevance of the predicted behavior of the object or the predicted event.

The modulation of the at least one directional stimulus signal for a decrease in relevance increases a value of the gradient of the modulation signal with the decrease in relevance.

In a further embodiment of the method, the modulation of the at least one directional stimulus signal for the decrease in relevance comprises a smaller value of the gradient of the modulation signal for an increased initial value of the relevance.

According to a further advantageous embodiment of method, the determined relevance is a function of at least one task objective, wherein the at least one task objective includes at least one of a traffic safety, a comfort of the assisted person, a state of the assisted person, and a target objective of another person.

The determined relevance may be a risk metric related to the predicted at least one behavior of the object or the predicted event.

The description uses the term salience for denoting a state or a condition of being prominent. Salience in particular refers to a relative importance or prominence of a part of a sign. The salience of a particular sign when considered in the context of others helps an individual person to quickly rank large amounts of information by importance and thus give attention to that which is the most important. This process keeps an individual from being overwhelmed with information overload.

Therefore, salience (or saliency) describes the degree by which an item perceptually stands out compared to its surroundings. A factor that commonly influences salience is contrast, such as a bright spot in a dark environment or a fast moving object among slow objects, but also high-level factors such as personal relevance may influence salience.

An earcon refers to a brief distinctive sound that represents a specific event or conveys information. In particular, an earcon is an auditory equivalent of an icon. A distinctive sound that represents specific information such as computer beeps which signal an error. In the present context, earcon refers to such artificial sound as well as to an auditory icon, which bases on actual recordings of characteristic sounds.

An element or relevant element in the environment denotes objects, structures in the environment and the current scenario, which influence decisions and actions of the assisted person in performing the task. Elements may be static (lane markers, traffic lights) or moving (vehicles, pedestrians) in case of road traffic applications, for example. Elements may be predicted events (e.g. predicted collisions) in the environment.

The term perceptibility denotes a degree by which an entity can be perceived by the assisted person. Generally, perceptibility is determined by the extent to which it may trigger sensors of the perceiving entity.

Relevance in the present context refers to a risk. Relevance is considered as proportionate to a risk, or a function of both risk and driver state.

FIG. 1 depicts a flowchart for an assistance method of an embodiment. The discussion of FIG. 1 illustrates the assistance method applied in a dynamic environment (road traffic environment) by an ego-vehicle 1, which is operated by the assisted person (driver) benefitting from support by the assistance method.

The method for assisting the person to perform a task, which is operating the ego-vehicle 1, in the dynamic environment comprises a step S1 of acquiring sensor data.

The method acquires data acquired data on the dynamic environment using sensors arranged on an ego-vehicle 1, which the assisted person operates in the road traffic environment. The term sensors includes not only on-board sensors operating on the radar-, lidar- or camera-principle, but also covers x-to-vehicle communication for acquiring data on the dynamic environment.

Based on the acquired data, the method proceeds by predicting at least one behavior of an object or event in the dynamic environment in step S2.

In step S3, the method proceeds by determining a relevance measure of the at least one behavior of the object or event based on the prediction.

In step S4 succeeding to step S3, the method determines whether the determined relevance measure exceeds at least one predetermined threshold level. If determining that the at least one determined threshold level is exceeded, the method proceeds to step S5 and to determining a modulation signal. If the determined relevance measure does not exceed the at least one predetermined threshold level, the method concludes that the predicted scene elements of the current scene in the dynamic environment do not require providing assistance to the assisted person in step S9.

In step S5, the method acquires at least one directional stimulus signal.

Furthermore, in step S6 the method generates a modulation signal. The modulation signal changes at least one signal parameter of the as a continuous function of the determined relevance. Step S6 proceeds by modulating the at least one directional stimulus signal with the modulation signal to generate at least one modulated directional stimulus signal. The resulting at least one modulated directional stimulus signal depends on a direction of the predicted at least one behavior of the object or event with respect to the assisted person.

In step S7, the assistance method provides the generated modulated directional stimulus to at least one actuator. In step S8, the at least one actuator outputs the at least one modulated stimulus signal to the assisted person and proceeds to the end of the current processing cycle of the assistance method.

The assistance method enables to reduce the influence of task-irrelevant factors or factors that potentially distract from the task performed by the assisted person.

Thus, the method supports the assisted person in performing a primary task, e.g. operating the ego-vehicle 1 in the traffic environment, and reduces distractions resulting from secondary occupations, e.g. following the information provided by an on-board infotainment system. The assistance method achieves this by increasing a relative perceptibility or salience of a factor by reducing the perceptibility or salience of other interfering factors, especially those the assistance system 20 determines to be irrelevant or distracting.

For instance, the sound produced by another vehicle through the engine and road/air friction is easier to notice and identify when the radio in one's own vehicle is turned off than when it is turned on, especially with high volume.

Accordingly, one part of this invention consists of reducing perceptibility- or salience-affecting aspects of a task-irrelevant distracting or interfering factor in proportion to the need for a user to attend to a different factor.

Regarding the application area of driver assistance in a traffic environment, the assisted person (driver) may be subject to a variety of potentially distracting sounds such as sound from the ego-vehicle's entertainment system, a phone call received via a wireless phone, or a conversation with another passenger in the ego-vehicle 1. In case the assistance system 20 predicts an approaching collision risk or a navigation choice, the attention of the assisted person should focus on the traffic environment, e.g. a road and other traffic participants, as much and as early as possible. In this case, the assistance method reduces a perceptibility or salience of distracting sounds influencing the assisted person by changing specific characteristics of the sound in proportion to the perceptibility or the salience of sounds conveying an importance of the predicted event. Such specific characteristics of the at least one directional stimulus signal changed by the modulation signal can be a sound-volume or a frequency spectrum of the at least one directional stimulus signal.

For example, as the determined relevance measure, or, in other terms, a risk for a potential danger increases the sound volume of the infotainment system decreases.

Alternatively, to prevent the assisted person from trying to counteract such a decrease by changing the sound volume of the infotainment system manually, the sound volume may stay at a constant or at least at an audible level but a perceived presence of the infotainment sound decreases by reducing specific frequency components in the frequency spectrum of the infotainment sound signal. An embodiment may implement this by performing low-pass filtering the infotainment sound signal, wherein a cut-off frequency of the low pass filter depends on the determined relevance measure. The low-pass filtering of the infotainment sound signal, which is a particular example for the modulation of the directional stimulus signal generates a perception of a distance for the assisted person related to the determined relevance measure.

Once the predicted event associated with the risk is no longer present or within predetermined limits of the assistance system, the potentially distracting infotainment sound signal can return to the levels present before the assistance system 20 started the modulation.

In order to give the assisted person some time to readjust to a resolved situation involving a risk, a return to a level of infotainment sound preceding the modulation due to a determined risk, for example, may be offset by a specific time delay, or follow a recovery curve of the modulation signal with a low gradient (flat slope) of the modulation strength vs. risk.

Additionally or alternatively, the assistance system 20 may vary a curve of the modulation signal individually for each speaker of the infotainment system 23. For instance, depending on how well the respective speaker is aligned spatially with a direction of the predicted element, e.g. a risk source, the modulation may follow a fast increase, e.g. have a high gradient (steep slope) when being close to the same direction, or follow a small gradient when having a larger direction difference to the risk element in the environment from the perspective of the assisted person. The assistance system 20 provides accordingly an early indication of the relevant direction towards the predicted risk element in the environment by the relatively fast local change in stimulus properties of the at least one modulated directed stimulus signal from at least one unmodulated directional stimulus signal.

Additionally or alternatively, the assistance method enables to increase a salience, and therefore an influence of task-relevant factors or factors that focus the attention to the task performed by the assisted person in the environment.

In combination with a reduction of the influence of distracting or irrelevant factors, the assistance system 20 may increase a relative perceptibility or salience of a relevant element involving a potential risk in the current scenario, for example by directly amplifying signal components of the at least one directional stimulus signal that are indicative of the respective relevant element. In case of using sound as medium for the at least one directional stimulus signal, the assistance method may achieve this by recording sound that originates from the relevant element in the environment using a microphone sensor. The assistance method may then amplify the recorded sound based on the modulation signal and output the amplified sound via speakers of the infotainment system arranged in the interior of the ego-vehicle 1 in the specific application area of the of driver assistance in the road traffic environment.

Additionally or alternatively, the assistance method can amplify the at least one directional stimulus signal on specific portions of the frequency spectrum of the at least one directional stimulus signal, corresponding to those portions of the frequency spectrum of the directional stimulus signal, which are reduced due representing an unwanted distraction (noise) from the task and the predicted element in the environment representing a risk.

In particular, when considering sound signal as the at least one directional stimulus signal, the assistance method may modulate based on the modulation signal characteristic parameters of the at least one directional stimulus signal, such as at least one of pitch, timbre, timing, and perceived spatial location to support the assisted person in separating of relevant elements from irrelevant elements in the environment.

Additionally or alternatively, the assistance method may use at least one recorded artificial stimulus signal that is indicative of the respective element representing a risk. The at least one artificial stimulus signal in the application area of sound signals can be realized by using earcons that are characteristic of a class of the relevant element, which the determined element is classified to belong to. If the predicted element includes an object such as a vehicle, the earcon may be a recorded sound file of an engine noise for vehicles. If the predicted element includes an object such as a pedestrian, the earcon may be a recorded sound file of footsteps of pedestrians.

Additionally or alternatively, the assistance method can, by varying an output balance between different speakers of an infotainment system 23 of the ego-vehicle 1 arranged in a stereo- or surround-setup, generate and output the at least one directional stimulus signal such that an apparent location of origin of the sound corresponds to the direction with respect to the assisted person 1 of the relevant element representing a risk in the environment.

In case of predicting multiple relevant elements in the environment that would result in classification as separate earcons, alternative strategies may also be applied in order to avoid sensory overload for the assisted person.

If a direction of the plural relevant elements as risk sources classified as separate earcons are in about a same direction ("closely aligned"), the assistance method may use a single representative sound instead of a mixture of the respective plural sounds associated with the plural relevant elements.

In case the directions the plural relevant elements represent multiple concurrent risk sources differ over a wide angle ("not aligned"), only a most relevant subset of the set of earcons may be represented by a representative sound without a directionality in the at least one directional stimulus signal. Alternatively, the assistance method may output a representative sound for the single most relevant direction of the plural relevant elements.

Additionally or alternatively, the assistance method may modulate the at least one directional stimulus signal to nudge the assisted person towards a predetermined action such as reducing a velocity $v_1$ of the ego-vehicle 1. Examples for directional stimulus signals achieving this target include stimuli with properties of an artificial engine sound that suggests an accelerating vehicle, general alarm sounds, sound that resembles squealing wheels of a vehicle, and crash sounds.

Additionally or alternatively, an approach comprises utilizing sound already present in the ego-vehicle 1, e.g., music provided by the infotainment system 23, to direct the assisted person's attention to a direction of the relevant element represent a potential risk in the environment. Instead of or in addition to modulating salience-influencing characteristics (parameters or properties) of the at least one directional stimulus signal, a virtual spatial origin of the sound already present in the ego-vehicles is adapted to align with the direction of the relevant element representing a risk by modulation with the modulation signal. This results in shifting spatially auditory elements the assisted person is likely to already attending to. In particular, the assistance method may perform such spatial shift for a portion of a frequency spectrum of the at least one directional stimulus signal. Thereby the assistance method generates, e.g. the effect of a simulated location change by some instruments of music output by the infotainment system 23.

Additionally or alternatively, in combination with sound data acquired by a microphone sensor recording sound from within the ego-vehicle 1, even a passenger's location may be shifted by a corresponding speaker output of the at least one modulated directional stimulus signal to a virtual location in a same direction from the assisted person's location as the direction towards the relevant element that represents the risk.

Alternatively, the assistance method may utilize simulated sound sources in the ego-vehicle 1 to shift their apparent location towards the opposite direction of the relevant element representing a risk, and thus away from the directional stimulus that represent the relevant element. This provides the advantage of facilitating attentional separation between relevant stimuli and irrelevant or at least less relevant stimuli from the perspective of the assisted person. The assistance method generates an intuitive effect of a relevant event displacing irrelevant elements in the environment until the situation has been resolved. In order to return to the prior situation, the assisted person is required to ensure that the relevant element representing a risk is sufficiently attended in order to reduce the associated relevance measure.

Alternatively, instead of aligning a virtual stimulus location or direction from the assisted person's view with the current location or direction of the respective relevant element representing a risk, a predicted (anticipated) future location or direction may be used instead of the at least one modulated directional stimulus signal. A prediction of the future evolvement may provide future locations for a predetermined time ahead, e.g. 0.5 to 2 s ahead. This feature is of particular beneficial in a highly dynamic environment. Furthermore, situations, which involve a delay between signal generation and output on the one hand, and perception and understanding by the assisted person make the conveyed location information might result in outdated information at the time of its perception by the user.

Alternatively or additionally, modulating the at least one directional stimulus signal may include amplification by using multimodal signaling. For instance, the method may rely on tactile actuators that serve as additional cues to highlight information and potentially enhance auditory perception by the assisted person.

Alternatively or additionally, a haptic stimulus would involve an actuator that tightens a seatbelt as a function of the risk.

Alternatively or additionally, visual cues using LED-arrays, HUD icons or features on the meter-display arranged in the ego-vehicle 1 may supplement the at least one modulated directional stimulus signal to improve situation awareness of the assisted person based on the at least one directional stimulus signal.

Multimodal cues may support the assisted person in differentiating between reasons for a reduction of task-irrelevant stimuli. If, for example, a change in sound characteristics, e.g. sound volume or frequency spectrum, of the infotainment system 23 could also be caused by a task-irrelevant event, e.g. traffic news, navigation instructions, a passenger playing with sound settings, the additional input from a different modality can make it apparent to the user that the primary task, e.g. risk avoidance, is the cause of a signal change. This enhanced understanding supports the assisted person in preventing wrong task prioritizations such as trying to change sound settings of the infotainment system 23 instead of focusing on the current scene in the environment. If the assisted person focuses on sound settings instead of the front scene when the volume goes down or another sound property changes, he will increase the risk instead of being more attentive. With a stimulus signal controlling an additional seatbelt tightening, a reason for the volume drop in the sound signal output by the infotainment system 23 is easier to interpret so that the assisted person will be nudged towards the correct action in response.

Another approach to prevent focus on sound settings is to use actions taken by the assisted person to manipulate sound settings, e.g. volume knob turning, speech commands, as a trigger to speed up the modulation by the modulation signal. This provides additional feedback to support understanding of the changed sound signal in the interior of the ego-vehicle.

The assistance method may achieve an improvement in sensitivity of the assisted person with respect to an increase in salience of stimuli pointing to relevant elements by a temporal separation between the modulation of irrelevant "noise" salience and task-relevant "signal" salience. Reducing "noise" salience would precede in time an increase in "signal" salience instead of taking place simultaneously. This generates a short period of silence of the modulated characteristics of the at least one directional stimulus signal. This period of silence enhances the contrast of the at least one modulated stimulus signal with respect to the at least one unmodulated stimulus signal. This is of particular advantage when implemented for a time immediately after a predetermined threshold for determining whether to assist the assisted person or not still has the necessary time for a reaction of the assisted person with low cost. As time pressure, and associated risk increases, modulation of the at least one directional stimulus signal may occur at at least one of a faster rate and with more temporal overlap between the at least one directional stimulus signal and the at least one modulated directional stimulus signal.

Additionally, assessing what level of modulation for the at least one direction stimulus signal is required, the assistance method may consider an actual soundscape close to the ears of the assisted person.

Integrating microphone sensors, preferably stereo microphones in at least one of a headrest and a ceiling above a driver's head, an estimate of what sound actually reaches the assisted person, is possible. The modulation signal may then be adapted to optimize the estimated perceived sound, rather than just changing parameters of the at least one directional stimulus signal. This enables the assistance method to take sound sources not directly controlled by the assistance system into regard. Additionally, the ego-vehicle's own noise and traffic-dependent noise variations are taken into accounted. Adding a feedback-loop into the processing further allows for the inclusion of active noise cancellation techniques into the processing of the assistance method.

The assistance method may further taking into account information about the assisted persons attention, his or hers attention history, and a vigilance of the assisted person in order to optimize the provided assistance by the at least one modulated directional stimulus signal.

The modulation signal may be generated based on at least one of information about the attention state of the assisted person, and an attention history of the assisted person. Sensors of the assistance system 20 enable monitoring the assisted person using processes of gaze- and head-tracking, measuring skin conductance and heart rate in order to generate a model of the attention of the assisted person.

An assisted person, whose gaze direction deviates substantially from a relevant direction of interest in the environment as determined during the prediction, could benefit from stimuli in the at least one modulated directional stimulus signal that gradually draw attention from an undesirable direction of the determined actual gaze direction towards the relevant direction of interest.

Alternatively, a modulation with the modulation signal may be directly a function of multiple variables such as the deviation of overt attention from the relevant direction of interest as well as the importance of the relevant element in the environment.

Information about an attention state of the assisted person and his or her attention history may be used in order to determine which element represents the most relevant and thereby useful for the assisted person to observe in order to address the current scenario sufficiently.

The attention history may be taken into account for generating the at least one modulated directional stimulus signal in cases in which a temporal integration may be contingent on specific scenario characteristics, for example long for a slowly changing environment and shorter for a highly dynamic environment involving rapid changes in the scenarios.

A confidence about the assisted person's situation awareness determined based on attention and attention history may be communicated directly to the assisted person by the actuators. Such feature may be beneficial to ensure an understanding of different elements that may contribute to the change in a signal.

Besides monitoring the assisted person, also other persons, e.g. passengers in the ego-vehicle 1, may be monitored in order to determine what level of modulation would be the most appropriate for the modulation signal. For example, if a passenger's behavior shows clear indications of the passenger being a possible distraction for the assisted person as the driver of the ego-vehicle 1, generating the modulation signal including scene-augmenting stimuli of high salience may be appropriate. If the passenger should be more passive or even sleeping, more subtle guidance through a basic noise reduction could be sufficient in the modulation signal.

Additionally, a passenger whose behavior indicates concern about a potential risk in the dynamic environment could be supported in including this concern by an amplified signaling of the relevant element's or presumed risk's direction in the at least one modulated directional stimulus signal.

Also for an attention-based modulation signal, an asymmetric recovery by a suitable gradient is advantageous. In case the monitoring the assisted person's gaze patterns or heart rate indicates a heightened vigilance or an uncertainty concerning the situation, an increased salience for directions towards other vehicles 2 in the environment included in the at least one modulated directional stimulus signal may be maintained until the assisted person is determined by the assistance method of having regained its confidence.

Taking information about the assumed or communicated targets of other agents in the dynamic environment further enables optimizing assistance of the assisted person according to global safety or efficiency targets as tasks.

In addition to basing the modulation signal exclusively on factors that are directly relevant to the assisted person, known or assumed objectives of other agents acting in the dynamic environment may be taken into consideration. This might trigger actions with positive second order effects that indirectly benefit a larger group of agents exceeding the assisted person as sole beneficiary of the assistance system.

An example in the area of driving assistance uses an inferred intention of a driver of another vehicle 2 based on acquired context information, individual actions of the driver and experience derived from recorded history information. For example, a driver of the vehicle 2 located on a highway entry lane may intend to change lanes in the near future; in another example, a driver of a vehicle 2 that slows down noticeably prior to a highway exit might intend to exit the highway.

When the assistance system of the ego-vehicle 1 by monitoring the environment recognizes that the current state of traffic impairs another traffic participant's ability to pursue such presumed intention, it may provide a modulated directional assistance signal to the assisted person operating the ego-vehicle 1 conveying information that the other vehicle 2 might benefit from a certain behavior of the assisted person. The assisted person has then the possibility to act accordingly, for example to enable the other traffic participant pursue his target by slowing down the ego-vehicle 1.

Figure 2:
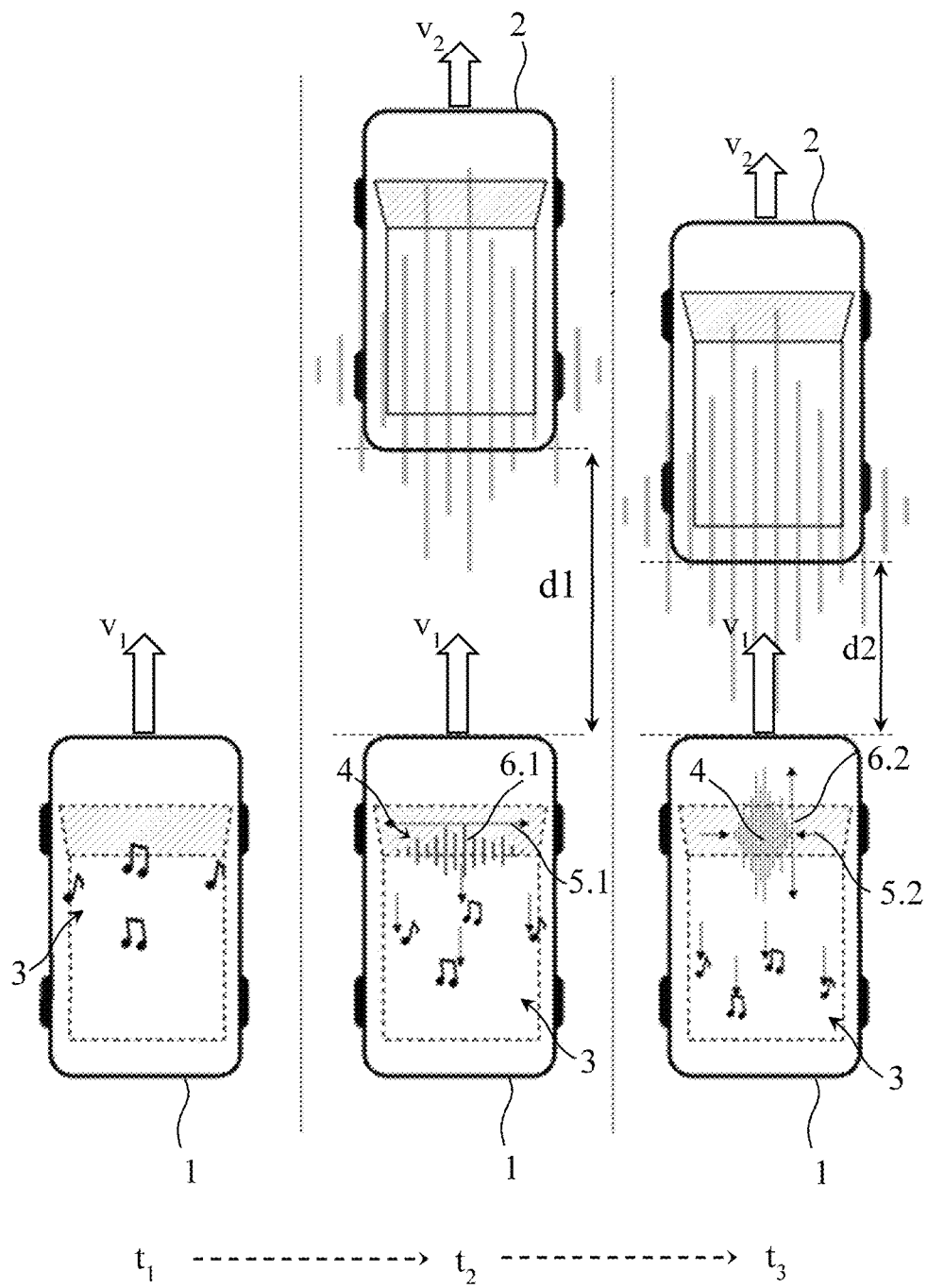
FIG. 2 illustrates application of the invention in a road traffic scenario.

FIG. 2 illustrates an application of the invention in a road traffic environment. In particular, FIG. 2 serves to illustrate a risk dependent modulation of spatial sound characteristics within the ego-vehicle 1, which is operated by the assisted person.

The ego-vehicle 1 is cruising along a segment of a road and depicted for three different points in time $t_1$, $t_2$, and $t_3$. The ego-vehicle 1 has a velocity $v_1$.

Musical notation depicted in the interior of the ego-vehicle 1 represents infotainment sound 3 output by speakers of an infotainment system of the ego-vehicle 1. The infotainment system is adapted to output sound via speakers arranged in the interior of the ego-vehicle 1 in a directed manner, so that the assisted person driving the ego-vehicle 1 from the driving seat perceives the sound to originate from a specific direction. This effect may be achieved by arranging plural speakers around the interior of the ego-vehicle 1 and adapting the sound streams for the specific speakers of the plurality in a processor accordingly.

At point in time $t_1$, processing of the data on the environment of the ego-vehicle 1 acquired by the assistance system 20 reveals no other objects or events associated with a significant relevance, in particular representing a risk to the steadily cruising ego-vehicle 1 are determined.

Proceeding to point in time $t_2$, the ego-vehicle 1 is cruising with velocity $v_1$ along the road segment. Driving in front of the ego-vehicle 1 is another vehicle 2 with a velocity $v_2$. At point in time $t_2$, the vehicle 2 is at a distance di in front of the ego-vehicle 1 in driving direction. The velocity $v_2$ is smaller than the velocity $v_1$. An assistance system 2, for example a driving assistance system that is implementing functions of a collision mitigating and braking system, will accordingly predict a potential relevant event in the future for the ego-vehicle 1. Under circumstances depicted in FIG. 2, the assistance system 20 predicts a possible collision of the ego-vehicle 1 with the vehicle 2 straight ahead of the ego-vehicle 1 in the driving direction. The assistance system determines a relevance measure, particularly a risk associated with the determined possible collision.

At point in time $t_3$, the vehicle 2 is at a distance d2 in front of the ego-vehicle 1 in driving direction. The velocity $v_2$ is still smaller than the velocity $v_1$. The distance d2 between the ego-vehicle 1 and the vehicle 2 decreased from a distance d1 at $t_2$ to a distance d1 at $t_3$. The assistance system 2, accordingly predicts a potential collision event as a relevant event for the in the future for the ego-vehicle 1. At $t_3$, the risk associated with the predicted collision event is increased when compared with the risk of the predicted collision event at $t_2$.

FIG. 2 depicts risk-related sound using stylized sound frequency spectrum bars 4.

The risk associated with the predicted front collision increases from point in time $t_1$ over point in time $t_2$ to point in time $t_3$. As the risk associated with the predicted collision increases from $t_2$ to $t_3$, an apparent location of the infotainment sound 3 as perceived by the assisted person is shifted towards the back of the ego-vehicle 1, as FIG. 2 shows when comparing infotainment sound 3 from $t_1$, $t_2$, and $t_3$.

Additionally or alternatively, the assistance system 20 generates and outputs sound that represents the risk associated with the predicted collision event to appear to originate from the front direction of the ego-vehicle 1. At point in time $t_2$, the sound 4 spatially spreads out over the frontal arc of the ego-vehicle 1 with a range 5.1 of the sound frequency spectrum bars 4 representing sound 4. From $t_2$ to $t_3$, the sound represented by the sound frequency spectrum bars 4 gradually focuses on a narrowed range 5.2 of directions, therefore indicating a focused direction from the ego-vehicle 1 towards the potential collision event ahead. Additionally or alternatively, the sound represented by the sound frequency spectrum bars 4 is further amplified as indicated by increasing the height of the sound frequency spectrum bars 4 from the point in time $t_2$ to point in time $t_3$ as the determined risk also increases from point in time $t_2$ to $t_3$ increases also.

Therefore, the assisted person situated in the driving seat of the ego-vehicle 1 will perceive the infotainment sound output by the infotainment system with a reduced salience or presence in directions towards the front of the ego-vehicle 1 from $t_1$ over $t_2$ to $t_3$. Simultaneously, the risk related sound represented by the sound frequency spectrum bars 4 output by the infotainment system is output with an increasing salience (or presence and focus) in directions towards the front of the ego-vehicle 1 from $t_2$ to $t_3$. The amended sound distribution in the ego-vehicle 1 from $t_1$ over $t_2$ to $t_3$ will draw the assisted person's attention with an increased salience towards the front of the ego-vehicle 1, and thereby enable the assisted person to act appropriately to mitigate the predicted collision by suitable actions. For example, the assisted person may initiate a lane change or decrease the velocity $v_1$ of the ego-vehicle 1.

Figure 3:
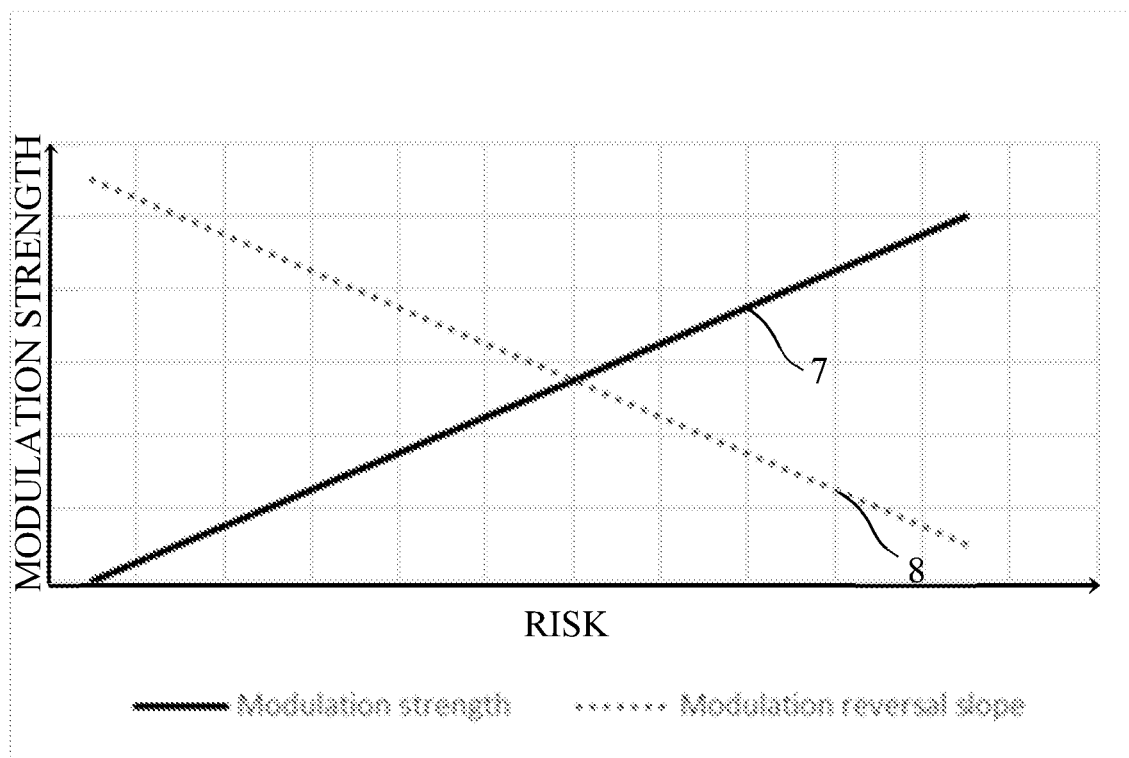
FIG. 3 illustrates risk a dependent stimulus modulation curve and a risk dependent stimulus modulation reversal curve according to an embodiment.

FIG. 3 illustrates risk dependent stimulus modulation curves according to an embodiment. FIG. 3 depicts that the assistance system 20 can behave asymmetric in terms of how stimuli are modulated in response to an increasing risk on the one hand and a decreasing risk on the other hand by the modulation signal. In this context, the relevance measure describes a risk for a particular predicted behavior of an object, or an event in the dynamic environment and will be denoted such for the discussion thereafter.

In the diagram of FIG. 3, the x-axis (abscissa) shows the relevance measure of a predicted behavior of an object or an event. The x-axis of FIG. 3 shows in particular a determined value of the risk. On the y-axis of FIG. 3 values for a modulation strength are shown. The modulation strength can be interpreted as a measure for the value of a stimulus generated and output by the assistance system 20.

In FIG. 3, curve 7 describes the strength of stimulus modulation as a function of the risk for a risk that increases over time. The shown strength of the stimulus modulation according to curve 7 increases with a constant gradient for an increasing risk.

FIG. 3 further shows a curve 7 describes the strength of stimulus modulation as a function of the risk for a risk that decreases with time. The shown strength of the stimulus modulation according to curve 7 decreases with a constant gradient for a decreasing risk. Preferably, the gradient of the decreasing risk has a smaller absolute value than the gradient of the curve for the increasing risk. Thus, the assistance system 20 behaves asymmetric in terms of how the at least one directional stimulus signal is modulated in response to increasing and decreasing risks respectively.

It is to be noted, that the relation between modulation strength and risk is not limited to a proportional dependence, as will be discussed with FIG. 4.

The asymmetric curves 7, 8 of the modulation strength have the effect that the modulation signal in response to an increasing risk results in immediate increase in strength of the stimulation of the assisted person by the at least one directional stimulus signal to support the perception of the assisted person as early as possible. On the other hand, the decrease in strength of the at least one modulated directional stimulus signal generated using the modulation signal in response to a decreasing risk follows the decrease in risk with lower gradient.

The effect of this approach of an asymmetric behavior of the assistance system 20 with respect to increasing risks and decreasing risks is to allow the assisted person to continue perceiving the current evolvement of the scene in the environment so that he or she assures him- or herself that a risk in the environment has been adequately resolved. While the assisted driver focusses on resolving one issue, he or she may neglect a development of other imminent potential risks. By the time the first risk has been resolved, such secondary risk may have become more severe and require quick attention. Assisted persons such as drivers may operate with such an assumption and, accordingly, may maintain a higher level of vigilance towards the environment after resolving an initial risk. The asymmetry in relation to handling of increasing and decreasing risks of the assistance system 20 enables the assisted person to assess for himself or herself increasing risks as early as possible, and to apply their attention for some time to assure that an evolved scene situation is safe again.

Alternatively or additionally, the gradient of curve 8, and thus a speed of recovery of the at least one directional stimulus signal to unmodulated values may depend on a previous or initial risk level from which the risk level starts to decrease. The higher a determined initial value of a risk before it start to decrease, the slower a return to the at least one unmodulated directional stimulus signal, for example an unmodulated infotainment sound output by the infotainment system 23 of the ego-vehicle 1. In this context, FIG. 4 depicts the relation between a modulation strength and a risk for a reversal of a stimulus modulation in response to a risk reduction depending on the prior risk level (initial risk level).

Figure 4:
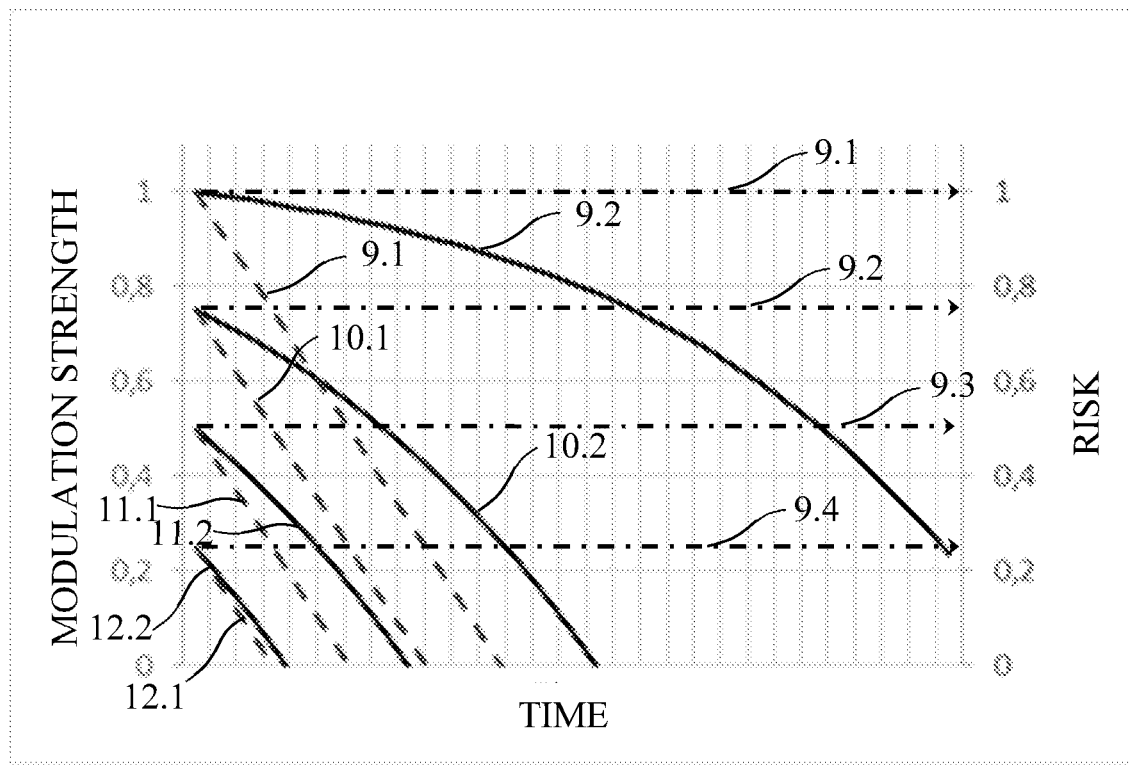
FIG. 4 illustrates risk dependent stimulus modulation reversal curves for different initial risks according to an embodiment.

FIG. 4 illustrates a risk dependent stimulus modulation reversal according to an embodiment.

In FIG. 4, the x-axis shows the time. On the y-axis arranged on the left, values of the modulation strength according to the modulation signal are shown. The y-axis arranged on the right of FIG. 4, enables to read a value for the risk.

FIG. 4 depicts curves 9, 10, 11, 12 for the modulation strength in solid lines 9.1, 10.1, 11.1, 12.1 for a risk reversal and a steadily falling risk in dashed lines 9.2, 10.2, 11.2, 12.2 over time for four different initial risk levels 9.3, 10.3, 11.3, and 12.3. The larger the initial risk level 9.3, 10.3, 11.3, 12.3 prior to risk reduction (decrease in risk), the lower an absolute value of a gradient of the reversal in stimulus modulation is initially. For a smaller initial risk, the reversal of the modulation strength occurs at a faster rate and approaches the rate of the corresponding reduction in risk.

A steadily decreasing modulation strength due to a decreasing risk accordingly can decrease slower than the actual decrease in in risk would require. In case the risk terminates decreasing and even starts to increase again, the assistance system may implement, for example, one of the following strategies.

In first scenario, the decrease in modulation strength may terminate once an increase in risk is determined until the determined increase in risk begins to align with a corresponding modulation strength at the level at which the decrease in modulation strength was terminated. When the modulation strength corresponding to the increasing risk reaches and surpasses the level of modulation strength at which the decrease in modulation strength terminated, the modulation strength starts to increase again following the increase in determined risk ("waiting until the risk picks up with the modulation strength").

In a second, alternative scenario, the actual risk stops its increase. The second scenario may also include that the actual risk again starts to decrease after having terminated decreasing before. In this scenario, the decrease in modulation strength may proceed to continue until aligning with a corresponding modulation strength for the constant actual risk or reaching a value of the modulation strength of 0 (zero), in case the determined actual risk disappears entirely.

Figure 5:
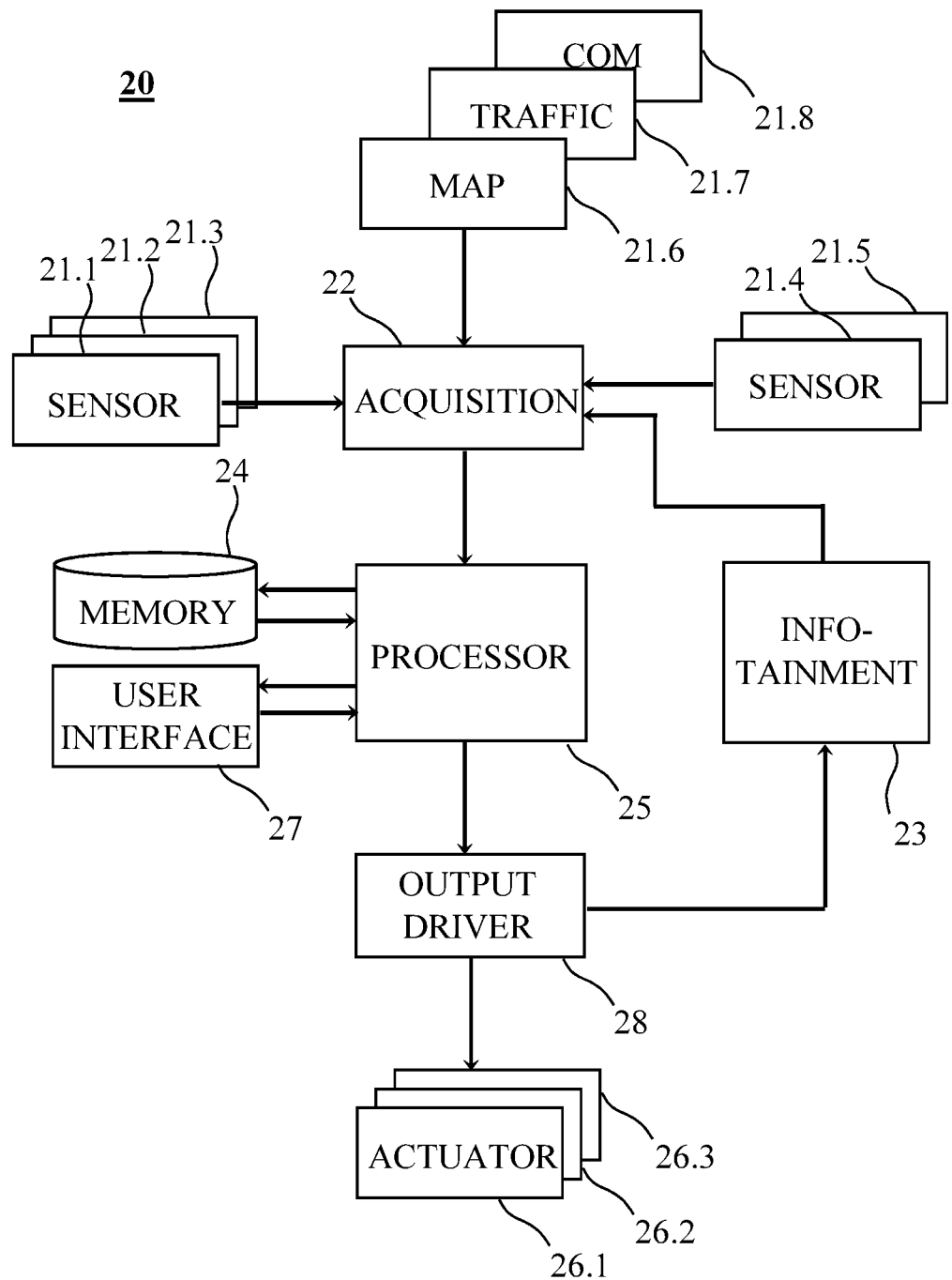
FIG. 5 shows an overview of structural elements of a system according to an embodiment.

FIG. 5 provides an overview of structural elements of an assistance system 20 according to an embodiment. In the context of FIG. 5, the assisted person is a driver of the ego-vehicle 1.

In particular, FIG. 5 displays major units (modules, means) of a driver assistance system that modulates the salience of sound output by an infotainment system 23 into the interior of the ego-vehicle 1, which is equipped with the driver assistance system 20. The sound output by the infotainment system 23 comprises infotainment sound 3, e.g. at least one of radio audio streams, music streams, and audio streams provided by a navigation system not shown in FIG. 5. The sound output by the infotainment system 23 further comprises multimodal stimuli relating to traffic elements in the environment exterior of the ego-vehicle 1.

The driver assistance system 20 comprises an acquisition unit 22. The driver assistance system 20 acquires via the acquisition unit 22 data on the environment of the ego-vehicle 1, which is a dynamic environment characterized by changing traffic scenarios the ego-vehicle 1 and its driver corresponding to the assisted person have to navigate.

The acquired data can include sensor data acquired by at least one sensor (sensor device) mounted on the ego-vehicle 1 and which senses the environment of the ego-vehicle 1. The sensors may comprise at least one of active and passive sensors, e.g. camera sensors 21.1, radar sensors 21.2, lidar sensor 21.2, acoustic sensors (microphones), ultrasonic sensors, temperature sensors in any combination.

The acquisition unit 22 may further acquire the data including sensor data acquired by at least one sensor (sensor device) mounted on the ego-vehicle 1 and which senses the interior of the ego-vehicle 1. Sensors acquiring sensor data from the interior of the ego-vehicle 1 may comprise at least one of active and passive sensors, e.g. camera sensors 21.4, acoustic sensors 21.5 (microphone), temperature sensors in any combination.

The acquisition unit 22 may further acquire data including map data from a map data provider 21.6.

Additionally or alternatively, the acquisition unit 22 acquires data including traffic data from a traffic data provider 21.7.

Additionally or alternatively, the acquisition unit 22 acquires data including x-to-vehicle data via a vehicle communication module 21.8. The vehicle communication module 21.8 may, for example enable to acquire from other vehicles 2 in the environment of the ego-vehicle 1 (vehicle-to-vehicle communication, but also from traffic infrastructure devices capable of infrastructure-to-vehicle communication). The vehicle communication module 21.8 can include, for example, at least one wireless communication module operating according to a specific cellular communication standard such as LTE, LTE-Advanced, and 5G.

Additionally or alternatively, the acquisition unit 22 acquires sound data including at least one sound data stream from an infotainment system 23.

The assistance system 20 of FIG. 5 comprises a processor 25 (electronic control unit, electronic data processing unit). The processor 25 may comprise a plurality of processing units arranged on the ego-vehicle 1, or arranged spatially separated from the ego-vehicle 1 and communicating with the ego-vehicle 1 via the communication unit 21.8, for example, and implement a distributed processing architecture.

The processor 25 stores and reads data from a memory unit 24. The memory 24 in FIG. 5 represents data storage capabilities for recording application data, for example, audio data streams in the form of audio files, or program code of the driver assistance system 20, or data generated and stored during execution of the program code. The memory 24 thus also performs as a RAM or ROM memory.

The assistance system 20 may additionally include a user interface 27. The user interface 27 distinct from the enables the assisted person to provide input data to the data assistance system 20 and to receive data output from the assistance system 20. The user interface 27 may include at least one display performing simultaneously as data input means, e.g. a touch screen. Via the user interface 27, the assisted person may indicate his confidence manually in his ability to address the current scenario in the dynamic environment as an alternative to the exclusively automatic assistance method. Alternatively, the assisted person may explicitly request assistance by the assistance system 20.

The processor 25, in particular, is configured to perform the steps of the assistance method as discussed with reference to FIG. 1.

The processor 25 provides output data to an output driver 28. The output data provided to the output driver comprises the at least one modulated directional stimulus signal.

The output driver 28 outputs the at least one modulated directional stimulus signal to the plurality of actuators 26.1, 26.2, 26.3 for outputting the at least one modulated directional stimulus signal to the assisted person.

Additionally or alternatively, the output driver 28 provides the at least one modulated directional stimulus signal to the infotainment system 23. The infotainment system 23 may include a plurality of loudspeakers not explicitly shown in FIG. 5 arranged in an interior of the ego-vehicle 1, in particular in a passenger cabin. Using loudspeakers of the infotainment system 23 requires a set of loudspeakers, which enable to provide acoustic stimulus signals to the assisted person, which the assisted person can distinguish with regard to the spatial origin, thus the direction from which the acoustic stimulus arrives at the location of the assisted person. The invention may therefore enhance the functionalities of a vehicle infotainment system to fulfill or complement functionalities of an assistance system.

The actuators 26.1, 26.2, 26.3 may include an arrangement of actuators arranged and adapted to provide directional stimuli to the assisted person using one or even plural sensory modalities such as sound, airflow, tactile senses of the assisted person in order to name a few possible implementation for the actuators 26.1, 26.2, 26.3.

In case of an increased risk of a front-collision, created by a sudden deceleration of another vehicle 2 to the front of the ego-vehicle 1, data acquired from the on-vehicle sensors 21.1, 21.2, 21.3 that provide data for monitoring distances d1, d2 and infer velocities $v_2$ of ambient objects, in particular vehicles 2, are determined (classified) 1 by the processor 25 as relevant for the assisted person performing the task of operating the ego-vehicle.

The processor 25 may perform a classification based on the acquired data that includes comparing a distance-dependent and a relative velocity-dependent risk measure such as a time headway with a threshold value.

The processor 25 may supplement the determined risk from classification by information from other sources, e.g. map data, traffic density data, local driving profile statistics, and further data acquired via x-to-vehicle communication.

Data including local driving profile statistics may, for example convey information such as "how fast do vehicles usually drive here".

Based on the classification, the processor 25 modulates parameters of the at least one directional stimulus signal that represent salience-relevant features, for example of the infotainment sound, such that the modulation increases continuously with the value (magnitude) of the determined risk measure.

The modulation performed by the processor 25 may include applying a spectral filter such as a low-pass/high-cut filter on the at least one directional stimulus signal. A variable filter cut-off frequency or a mix between filtered and unfiltered sound components of the at least one directional stimulus signal can be set as a function of the determined risk measure. Thus, in the case of a low-pass filter, high frequency components of the infotainment sound components to the assisted person from a front direction are removed gradually as the risk measure associated with the front-collision increases.

Additionally or alternatively, modulating the at least one directional stimulus signal comprises at least one of limiting and equalizing an amplitude range of an infotainment sound spectrum of the infotainment signal. This modulation takes into account that loudness spikes also influence the salience of sound. An undesired impact of attention-capturing sounds, for example a ringing sound of a mobile phone, on the assisted person's attention is effectively reduced.

Additionally or alternatively, the modulation comprises adapting an apparent origin of infotainment sound such that the apparent origin shifts gradually towards a direction opposite to the direction of the determined at least one behavior of an object or event in the environment as the value of the associated risk measure increases. In case the predicted event is a front collision, the infotainment sound may shift towards the rear of the ego-vehicle 1.

Additionally or alternatively, the shift in apparent origin of the infotainment sound can be orthogonal to a plane of movement, in which the ego-vehicle 1 is moving, e.g. moving in a downward direction or in an upward direction with respect to the plane of movement, depending on changes of the associated risk measure.

Furthermore, the processor 25 may generate or augment stimuli that guide the assisted person to focus his or her attention on towards the relevant directions in the environment. The processor 25 may generate theses stimuli and output them via the actuators 26.1, 26.2, 26.3 and/or the infotainment system 23 simultaneously or in close succession.

The sensors 21.1, 21.2, 21.3 may include microphones arranged on the outside of on the ego-vehicle 1 in order to capture environmental sound from exterior environment, and in particular sound originating from the direction of the predicted behavior of the object or predicted event, thus originating from the spatial direction of the risk from the ego-vehicle's point of view. The processor 25 may control playback of this sound using speakers of the infotainment system 23 inside the ego-vehicle 1. In particular, the processor 25 may control playback of the sound utilizing frequency components of the at least one modulated directional stimulus signal, which are filtered out for infotainment sounds when modulating the at least one the directional stimulus signal. The processor 25 may adjust relative sound volumes for individual speakers of the infotainment system 23 inside the ego-vehicle 1 to generate a virtual sound origin as perceived by the assisted person that corresponds to the direction of the respective risk.

Additionally, the processor 25 may control the at least one modulated directional stimulus signal depending on a determined level of the risk, with a varying precision of the sound as perceived by the assisted person. Varying a precision of the sound as perceived by the assisted person may ensure that the apparent location of the output sound aligns more specifically with the direction of the predicted risk. The modulation signal may modulate the at least one directional stimulus signal such that the larger the risk is measured or classified, the output sound is concentrated to a smaller angular region in direction of the predicted risk. Alternatively, in case of a smaller measured or classified risk, the output sound is concentrated to a wider angular region in direction of the predicted risk. By making this precision in directionality of the output sound depending on the value on the relevance measure of the determined risk, instead of, for example, being always at the highest possible level, a negative complacency or an attention tunnelling effect on the assisted person is avoided. Such negative complacency or an attention tunnelling effect would result in limiting the assisted person's attention early to a narrow region already for low values of the relevance measure or risk levels.

Additionally or alternatively, the processor 25 may control the modulation of the at least one directional stimulus signal such that an output volume of the at least one output modulated directional stimulus signal increases continuously with an increasing relevance measure or risk level until reaching a predetermined maximum value.

The processor 25 of the assistance system 20 may include an ambient sound augmentation module that is adapted to generate artificial sound. Artificial sound may be stored as artificial sound files in the memory 24. The generated artificial sound files are semantically associated with predetermined behavior of objects or events, and therefore with specific sources or source categories of risk. Generating and storing artificial sound files enables to overcome the problem that other traffic participants may not necessarily produce sound that the sensors 21.1, 21.2, 21.3 are able to capture, especially over large distances in a potentially noisy environment.

Generating artificial sound files may, in a first step, involve forwarding data on a particular risk source obtained by the sensors 21.1, 21.2, 213, or acquired using x-to-vehicle communication to a classification module, which associates the particular risk source with a specific risk category, or both. For each risk category, the assistance system 20 may play a matching artificial sound file such as an engine sound for a vehicle 2, or footsteps for a pedestrian. The artificial sound files may form part of a set of artificial sound files that is optimized to include attention-capturing elements, which increase in salience with an increasing risk. An attention-capturing element can be, for example a loud sound onset. Another example for an attention-capturing element is an emphasis on sound characteristics that contrast with sound characteristics of less relevant sounds, e.g. infotainment sound output by the infotainment system 23. Sound characteristics may include sound parameters like, for example, pitch, timbre, or spatial location. An artificial sound file selected by the processor 25 may be replayed periodically while the risk is determined to be present. The loud onset of the artificial sound file may be varied with each iteration depending on whether a value of the relevance measure or the risk increases (loudness increase), decreases (no onset amplification) or stays constant (no amplification or iteratively reduced onset amplification).

As with a recorded ambient sound, artificial sound is generated and output in the at least one modulated directional stimulus signal to create the illusion for the assisted person towards the direction of the respective risk source, and with a sound volume level that is determined based on the risk measure, for example proportional to a determined level of the risk.

The assistance system 20 may include one or plural actuators 26.1, 26.2, 26.3. The actuators 26.1, 26.2, 26.3 may be adapted to provide visual, tactile, vestibular or olfactory stimuli to the assisted person. Thus, in order to assist the assisted person in distinguishing between risk-related and other, for example infotainment-related sounds. By using stimuli, in particular directional stimuli, output by the actuators 26.1, 26.2, 26.3, the assistance system may also take advantage of human multimodal sensory processing capabilities. The processor 25 may therefore augment the output of the at least one modulated directional stimulus signal that conveys information on predicted behavior of objects or predicted events via the infotainments system 23 by using visual, tactile, vestibular or olfactory stimuli based on the modulation signal.

The actuators 26.1, 26.2, 26.3 can include tactile actuators integrated into at least one of a steering wheel, seat, and seatbelt of the ego-vehicle 1 and controlled by the processor 25 via the output driver 28 enable to enhance an auditory perception by the respective stimulus signal output by the actuators 26.1, 26.2, 26. The processor 25 may perform a translation of a subset of an auditory frequency spectrum into vibrations. Examples for tactile actuators of this kind are Fujitsu Ontenna or Neosensory Buzz). Additionally, a characteristic of tactile stimulation by the tactile actuators 26.1, 26.2, 26.3 such as the intensity of the stimulation may be modulated according to the respective value of the relevance measure or risk level.

Alternatively or additionally, the actuators 26.1, 26.2, 26.3 may include an air ventilation system of the ego-vehicle 1. The processor 25 may control the air ventilation system to output an airstream towards the assisted person that originates from a direction towards the predicted behavior of the object or the predicted event with its associated relevance measure or risk level. A strength of the air stream may represent a characteristic parameter that is modulated based on the respective value of the relevance measure.

Alternatively or additionally, the actuators 26.1, 26.2, 26.3 may include a device adapted to disperse within the ego-vehicle 1 odorous molecules with attention increasing properties in situations of high risk.

Alternatively or additionally, the actuators 26.1, 26.2, 26.3 may include visual elements in a dashboard, a head-up display, light-strips on the center console of the ego-vehicle 1 may further point towards or highlight a direction towards an predicted element of risk in the environment of the ego-vehicle.

Alternatively or additionally, the actuators 26.1, 26.2, 26.3 may augment the at least one modulated directional stimulus signal by outputting verbal strings such as the name of the assisted person, or other semantically associated sound signals in order to increase attention of the assisted person.

The sensors acquiring sensor data from the interior of the ego-vehicle 1 may comprise at least one of active and passive sensors, e.g. camera sensors 21.4, acoustic sensors 21.5 (microphone). This enables to implement in the processor 25 a processing, which not only makes the slopes of the modulation signal depending on the determined values of the relevance measure, but optionally also on information about the assisted person. In particular, the assistance system 20 may determine the assisted person's state of attention, a vigilance of the assisted person and an attention history of the assisted person.

The camera sensor 21.4 may provide image data, which enables monitoring at least one of head- and eye movement of the assisted person. The processor 25 may be configured to estimate which aspects of a current scene in the environment the assisted person perceives. The processor 25 determine gaze patterns and fixation durations of the assisted person based on the image data to refine probability estimates for the perception of different elements in the environment, and in particular on the predicted behavior of objects and predicted events involving these objects.

The sensors acquiring sensor data from the interior of the ego-vehicle 1 may comprise sensors for determining other physiological measures, such as a pupil-dilation, a heart rate and a skin conductance, which enable to estimate the vigilance of the assisted person.

The processor 25 may use the determined information on the assisted person's attention and the vigilance of the assisted person to tailor the provided assistance to the assisted person to its estimated actual needs, according to a determined scene context and stored data about human behavioral patterns. The assistance system 20 may amplify a stimulus modulation by the modulation signal further whenever the assistance system 20 determines the vigilance of the assisted person, or the determined attention of the assisted person to the task is lower than a threshold that corresponds to a predetermined minimum attention or vigilance level required.

The determined attention level or the vigilance of the assisted person may further be used by the assistance system 20 for adapting a gradient of the modulation signal after the relevance measure or the risk level significantly decreases. For example, if a determined vigilance of the assisted person reaches regular levels well ahead of the reduction of the modulation signal after a risk has been resolved, the gradient of the modulation signal, and thereby the slope of the recovery, may be increased.

Alternatively, the assistance system 20 may determine the assisted person's individual need for support to require maintaining high modulation levels of the modulation signal unless the assisted person shows a sufficiently high level of vigilance. This processing results in enforcing a safety margin in the assistance to the assisted person.

The assistance system 20 may include a user interface 27. The user interface 27 may enable a manual modulation by the assisted person, for example by using a button press or a speech command with the user interface 27.

The description of an embodiment relied on an application scenario in the field of automotive assistance systems. Driver assistance systems present only one particularly useful application area of the invention. The invention is applicable in other mobility-related scenarios, in which multiple elements of the scenario in the environment differ in their associated relevance for the primary target of an assisted person but compete for the assisted person's attention. Applying the assistance method according to the attached claims increases safety by enhancing the assisted person's ability to perceive the environment where considered necessary without causing annoyance or impairing the assisted person's autonomy. Thus, acceptance of the assistance method with the assisted person is increased.

Thus, application areas include not only driver assistance in road traffic, but also navigator assistance in maritime traffic, or pilot assistance in air traffic scenarios.

A further advantageous application scenario for the invention concerns assistance in remote control of mobile vehicles in ground based, air based or sea based scenarios.

The invention claimed is:

1. A method for assisting a person to perform a task in a dynamic environment, the method comprising:
    acquiring data on the dynamic environment,
    predicting at least one behavior of an object or event in the dynamic environment based on the acquired data,
    determining a relevance measure of the at least one behavior of the object or event based on the prediction,
    generating a modulation signal, wherein the modulation signal changes at least one signal parameter as a function of the determined relevance,
    modulating at least one directional stimulus signal with the modulation signal, wherein the at least one modulated directional stimulus signal further depends on a direction of the predicted at least one behavior of the object or event with respect to the assisted person, and
    outputting the at least one modulated stimulus signal to the assisted person and the method further comprising:
    detecting further stimuli perceivable by the assisted person and including the detected further stimuli in the at least one directional stimulus signal before modulating the at least one directional stimulus signal.

2. The method according to claim 1, wherein the method comprises
    determining a state of the assisted person, and adapting a risk-dependent stimulus modulation based on the determined state.

3. The method according to claim 2, wherein
    the determined state of the assisted person comprises at least one of a state of attention of the assisted person, an attention history of the assisted person, and a vigilance of the assisted person.

4. The method according to claim 1, wherein
    the at least one directional stimulus signal includes at least one of an audio signal, a visual signal, and a tactile signal.

5. The method according to claim 1, wherein
    the at least one directional stimulus signal includes an artificial stimulus signal.

6. The method according to claim 1, wherein
    the at least one signal parameter is one of a stimulus amplitude, a stimulus frequency, a stimulus repetition rate, and a perceived signal direction.

7. The method according to claim 1, wherein
    the at least one directional stimulus signal includes at least one of an audio signal stream, and the at least one signal parameter is one of an audio volume and an audio signal frequency band.

8. The method according to claim 1, wherein
    the function of the determined relevance is a continuous function, and the continuous function continuously increases a salience of the at least one directional stimulus signal perceived by the assisted person for an increase in the determined relevance, or
    the continuous function continuously decreases a perceived distance to the at least one predicted behavior of the object or the event in the at least one directional stimulus signal perceived by the assisted person for an increase in the determined relevance.

9. The method according to claim 1, wherein
    the function of the determined relevance is a continuous function, the continuous function continuously decreases a salience of the at least one directional stimulus signal perceived by the assisted person for a decrease in the determined relevance.

10. The method according to claim 9, wherein
    a value of a gradient of the continuous function for a decrease in salience of the at least one directional stimulus signal over time is smaller than the value of the gradient of the continuous function for the increase in salience of the at least one directional stimulus signal over time.

11. The method according to claim 1, wherein
    the modulation of the at least one directional stimulus signal for a decrease in relevance increases a value of a gradient of the modulation signal with the decrease in relevance.

12. The method according to claim 1, wherein
    the modulation of the at least one directional stimulus signal for a decrease in relevance comprises a smaller value of a gradient of the modulation signal for an increased initial value of the relevance.

13. The method according to claim 1, wherein
    the determined relevance is a function of at least one task objective, wherein
    the at least one task objective includes at least one of a traffic safety, a comfort of the assisted person, a state of the assisted person, and a target objective of another person.

14. The method according to claim 1, wherein
    the determined relevance is a risk metric related to the predicted at least one behavior of the object or the predicted event.

15. An non-transitory computer-readable storage medium embodying a computer program of machine-readable instructions executable by a digital processing apparatus that cause the digital processing apparatus to perform operations according to claim 1.

16. The method according to claim 1, wherein
    the at least one directional stimulus signal includes a recorded sound signal.

17. An assistance system for assisting a person to
    perform a task in a dynamic environment the system comprising:
    an acquisition interface configured to acquire data on the dynamic environment,
    a processor configured to predict at least one behavior of an object or event in the dynamic environment based on the acquired data, to determine a relevance measure of the at least one behavior of the object or event based on the prediction, to generate a modulation signal, wherein the modulation signal changes at least one signal parameter as a continuous function of the determined relevance, and to modulate at least one directional stimulus signal with the modulation signal, wherein the at least one modulated directional stimulus signal further depends on a direction of the predicted at least one behavior of the object or event with respect to the assisted person, and the system further comprising at least one actuator configured to output the at least one modulated stimulus signal to the assisted person, and at least one sensor configured to detect further stimuli perceivable by the assisted person, and the processor is configured to include the detected further stimuli in the at least one directional stimulus signal before modulating the at least one directional stimulus signal.

\* \* \* \* \*